United States Patent
Suzuki et al.

(10) Patent No.: US 7,529,964 B2
(45) Date of Patent: May 5, 2009

(54) DATA DUPLICATION METHOD IN A DISASTER RECOVERY SYSTEM

(75) Inventors: Yoshio Suzuki, Tokyo (JP); Nobuo Kawamura, Atsugi (JP); Kota Yamaguchi, Yamato (JP); Satoru Watanabe, Tokyo (JP); Shinji Fujiwara, Sagamihara (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 709 days.

(21) Appl. No.: 10/930,832

(22) Filed: Sep. 1, 2004

(65) Prior Publication Data

US 2006/0026452 A1  Feb. 2, 2006

(30) Foreign Application Priority Data

Jul. 30, 2004  (JP) ............................. 2004-223776

(51) Int. Cl.
*G06F 11/00* (2006.01)
(52) U.S. Cl. .................. 714/5; 714/6; 714/20
(58) Field of Classification Search ...... 714/5, 714/6, 19, 20
See application file for complete search history.

(56) References Cited

U.S. PATENT DOCUMENTS

| | | | |
|---|---|---|---|
| 5,796,934 A * | 8/1998 | Bhanot et al. ................... 714/4 |
| 6,408,310 B1 * | 6/2002 | Hart ............................ 707/201 |
| 6,487,560 B1 | 11/2002 | LaRue et al. |
| 6,718,348 B1 | 4/2004 | Novak et al. |
| 6,832,330 B1 * | 12/2004 | Boudrie et al. ................. 714/6 |
| 6,895,417 B2 | 5/2005 | Obara et al. |
| 6,925,476 B1 | 8/2005 | Multer et al. |
| 6,934,725 B1 * | 8/2005 | Dings ......................... 707/204 |
| 6,934,877 B2 * | 8/2005 | Tamatsu ......................... 714/5 |
| 6,948,089 B2 * | 9/2005 | Fujibayashi ..................... 714/6 |
| 7,028,140 B2 * | 4/2006 | Tabuchi et al. ............... 711/114 |
| 7,082,446 B1 * | 7/2006 | Bottomley ................... 707/204 |
| 7,210,061 B2 * | 4/2007 | Anderson ....................... 714/7 |
| 7,272,686 B2 * | 9/2007 | Yagisawa et al. ............ 711/114 |
| 7,275,185 B2 * | 9/2007 | Awada et al. .................. 714/47 |
| 2003/0208511 A1 | 11/2003 | Earl et al. |
| 2004/0098425 A1 | 5/2004 | Wiss et al. |

OTHER PUBLICATIONS

Microsoft Computer Dictionary, Fifth Edition; 2002; Microsoft Press; pp. 357, 498-499.*

(Continued)

*Primary Examiner*—Joshua A Lohn
(74) *Attorney, Agent, or Firm*—Antonelli, Terry, Stout & Kraus, LLP.

(57) ABSTRACT

A recovery of a secondary DB is executed by a log including a update difference of a primary DB, and a command is executed by adding the command to the log and analyzing the log by a secondary site. An operation command execution in the secondary site is applied to the DB having the consistency in the transaction at the same timing as a primary site or an intended timing, by transferring and executing the operation command via the log. In the case that the command is constituted by a snap shot generating instruction, a plurality of volumes of a mirror set forming a secondary storage apparatus are set to a pair state and the secondary DB is written in each of the volumes and synchronized, and the mirror set is set to a split state after the synchronization is finished, whereby a secondary DB is stored.

14 Claims, 11 Drawing Sheets

OTHER PUBLICATIONS

Mikkelsen, Claus, "*The Hitachi NanoCopy™ Advantage—An Industry First for Point-in-Time and Real-Time Copy*," [online], "searched on Jul. 16, 2004" via the Internet http://www.hds.com/pdf/wp134_nanocopy.pdf. 17 pages.

Oracle Data Guard, "Overview of Oracle Data Guard Functional Components", "Searched on Jul. 16, 2004", via the Internet, http://otn.oracle.com/deplay/availability/htdocs/DataGuardOverview.html. 6 pages.

* cited by examiner

INSTRUCT INITIAL STATE
/OPERATION COMMAND

EXECUTE PRIMARY
SITE OPERATION
/ GEMERATE LOG

EXECUTE SECONDARY
SITE OPERATION

DATA DUPLICATION METHOD IN A DISASTER RECOVERY SYSTEM

CROSS-REFERENCE TO RELATED APPLICATION

The present application claims priority from Japanese Patent Application No. JP 2004-223776 filed on Jul. 30, 2004, the content of which is hereby incorporated by reference into this application.

The present application is related to the following prior U.S. applications, the disclosures of which are hereby incorporated by reference into this application:
(1) U.S. Ser. No. 10/849006, filed May 20, 2004
(2) U.S. Ser. No. 10/184246, filed Jun. 26, 2004
(3) U.S. Ser. No. 10/819191, filed Apr. 7, 2004
(4) U.S. Ser. No. 10/650842, filed Aug. 29, 2003.

TECHNICAL FIELD OF THE INVENTION

The present invention relates to an improvement of a disaster recovery system, and more particularly to a disaster recovery system suitable for a database.

BACKGROUND OF THE INVENTION

In recent years, an information technology (IT) system is indispensable in business, and it is important to continue the business even in the case of a disability or a disaster. An opportunity loss caused by the IT system stop is enormous, for example, is said to amount to some millions dollar in a banking business and a large company. In view of the background mentioned above, a disaster recovery (hereinafter, refer to DR) system is paid attention, the DR system being structured such as to prepare two sites comprising primary and secondary sites capable of actuating the database, back up business data to the secondary site at a usual time and continue the operation by the secondary site at a disaster time.

In the DR system, each of the primary site and the secondary site is provided with a database (hereinafter, refer to DB) server and a storage apparatus from a usual time. Accordingly, great much cost is required for constructing and maintaining the DR system such as construction and control costs of the primary and secondary sites, a circuit cost and the like. However, it is said that a probability at which the disaster is actually generated is some % in all the disability. Accordingly, in recent years when it is desired to make the business efficient and reduce the cost, an added value is required in the DR system.

As one example of the added value mentioned above, there is a backup system corresponding to Rolling Disaster in which the DR system is highly developed.

The Rolling Disaster means that each of the system constituting elements is gradually broken at different timings at a time when the disaster is generated, in place that the system constituting elements are broken simultaneously. Accordingly, update of the data is transferred from the primary site to the secondary site on and after the disaster is generated, so that there is generated a possibility that a consistency is not secured in the data backed up in the secondary site.

In order to cope with the Rolling Disaster mentioned above, there is known a structure which stores a point in time (PiT) image before the disaster is generated, in addition to a most recent PiT image in the database (for example, Claus Mikkelsen, "The Hitachi NanoCopy Advantage", pp. 9-11, [online], "searched on Jul. 16, 2004", via the Internet http://www.hds.com/pdf/wp134_nanocopy.pdf).

This is structured such that the secondary site is provided with a first volume and a second volume, the primary site repeats interruption and recovery of a remote copy by a timer, the secondary site records the remote copy in the first volume at a time of receiving the remote copy, and when the remote copy is interrupted, the secondary site copies the data from the first volume to the second volume after confirming that the primary site has no disability, thereby preparing the PiT image at that time point. When the primary site returns the remote copy, the secondary site writes the date in the first volume. Accordingly, the secondary site always stores most recent generation of backup (the first volume) and one generation anterior backup (the second volume), and even if the writing is executed in the first volume due to the Rolling Disaster, it is possible to return on the basis of the one generation anterior backup stored in the second volume.

Another example which gives the added value of the DR system, there is known a structure which executes a searching process of the DB in addition to the backup, by the secondary site which has a lower load than the primary site (for example, "Oracle Data Guard", "Overview of Oracle Data Guard Functional Components", [online], "Searched on Jul. 16, 2004", via the Internet, http://otn.oracle.com/deploy/availability/ht-docs/DataGuardOverv iew.html).

This is structured such that each of the primary site and the secondary site is provided with a database management system (DBMS) and a storage apparatus, and the primary and secondary sites are connected only by a network between servers. Further, the DBMS of the primary site transfers log to the DBMS of the secondary site at the same time of writing the data in the storage apparatus. The DBMS of the secondary site writes the received log in the storage apparatus. Further, in the secondary site, the DB is updated by applying the log written in the storage apparatus to the DB of the secondary site at the time of not executing the operation such as the searching process or the like.

SUMMARY OF THE INVENTION

In the former conventional art (non-patent document 1), since the one generation anterior backup is acquired at a predetermined time interval, there is a problem that it is hard to back up the data just before the disaster is generated. Further, the secondary site copies the volume base by the first and second volumes, the consistency of the stored backup is not assured in a transaction level. Accordingly, in order to activate the DB by the backup of the secondary site, it is necessary to carry out a process for recovering the consistency of the transaction, so that there is a problem that a lot of time is required for recovering the DB.

Further, in the latter conventional art, the DB is recovered by activating the DBMS by the secondary site from the usual time and applying the log from the primary site to the DB of the secondary site, and the added value of the DR system is attempted to improve by executing the searching process. However, in the case of executing the log application, it is necessary to interrupt the searching process, so that there is a problem that it is impossible to always provide the business. This is because the consistency in the transaction level is not assured as mentioned above, even if the DB is recovered by the log application. In order to secure the consistency in the transaction level, it is necessary to carry out a process of analyzing the log in the transaction level, and the process can not be executed in parallel to the log application mentioned above.

Accordingly, the present invention is made by taking the problem mentioned above into consideration, and an object of the present invention is to recover a database with no deficit of data by preparing a backup having a consistency in a transaction level, and another object of the present invention is to improve an added value of a DR system by making an operation of a secondary site easy and providing a business by the secondary site.

In accordance with the present invention, there is provided a data duplication method of duplicating a first database executed by a first system to a second database stored in a second storage provided in a second system, comprising: a process of recording a log of a update difference of the first database in a first storage; a process of writing the update difference of the first database in the first storage; a process of adding an operation command applied to the first or second system to the log; a process of transferring the log including the update difference and the command to the second system; a process of storing the transferred log in the second storage; a process of reading the log of the second storage and recovering the second database on the basis of the log of the update difference; a process of extracting the command from the log of the second storage; and a process of executing the extracted command, thereby controlling the second system via the log.

Further, the process of adding the command to the log includes a process of adding to the log a snap shot preparing command for instructing a preparation of a snap shot by the second system, and the process of executing the extracted command includes a process of setting a plurality of volumes of a mirror set constituting the second storage to a pair state so as to write the second database in each of the volumes and synchronize, and a process of setting the mirror set to a split state so as to store the second database after the synchronization is finished, in the case that the extracted command is a snap shot preparing command.

Further, when preparing the snap shot, the first and second databases are staticized.

In this case, the operation command may be constituted by DBMS or OS, or an application command, in addition to the snap shot.

Accordingly, the present invention can control from the first system to the second system by executing the recovery of the second data by the log including the update difference of the first database and adding the command to the log while achieving the recovery of the database with no deficit.

Further, since the operation command is transferred and executed by the log application, it is possible to execute the operation command at the same timing with respect to the database in the same state in which the transaction consistency is secured in the primary and secondary sites (the first system and the second system) with respect to the database.

In the case of using for the snap shot preparation, if the snap shot preparation is instructed, the second database can be stored by setting a plurality of volumes of the mirror set constituting the second storage to the pair state so as to write the second database to each of the volumes and synchronize, and setting the mirror set to the split state after finishing the synchronization. Since the second database stored in this manner can be utilized in the second system independently from the first system, it is possible to improve the added value of the disaster recovery system in which a lot of cost is required for construction and operation.

In particular, since the first and second database are staticized, it is possible to easily prepare the backup (the snap shot) having the consistency in the transaction level.

BRIEF DESCRIPTIONS OF THE DRAWINGS

Figure 10:
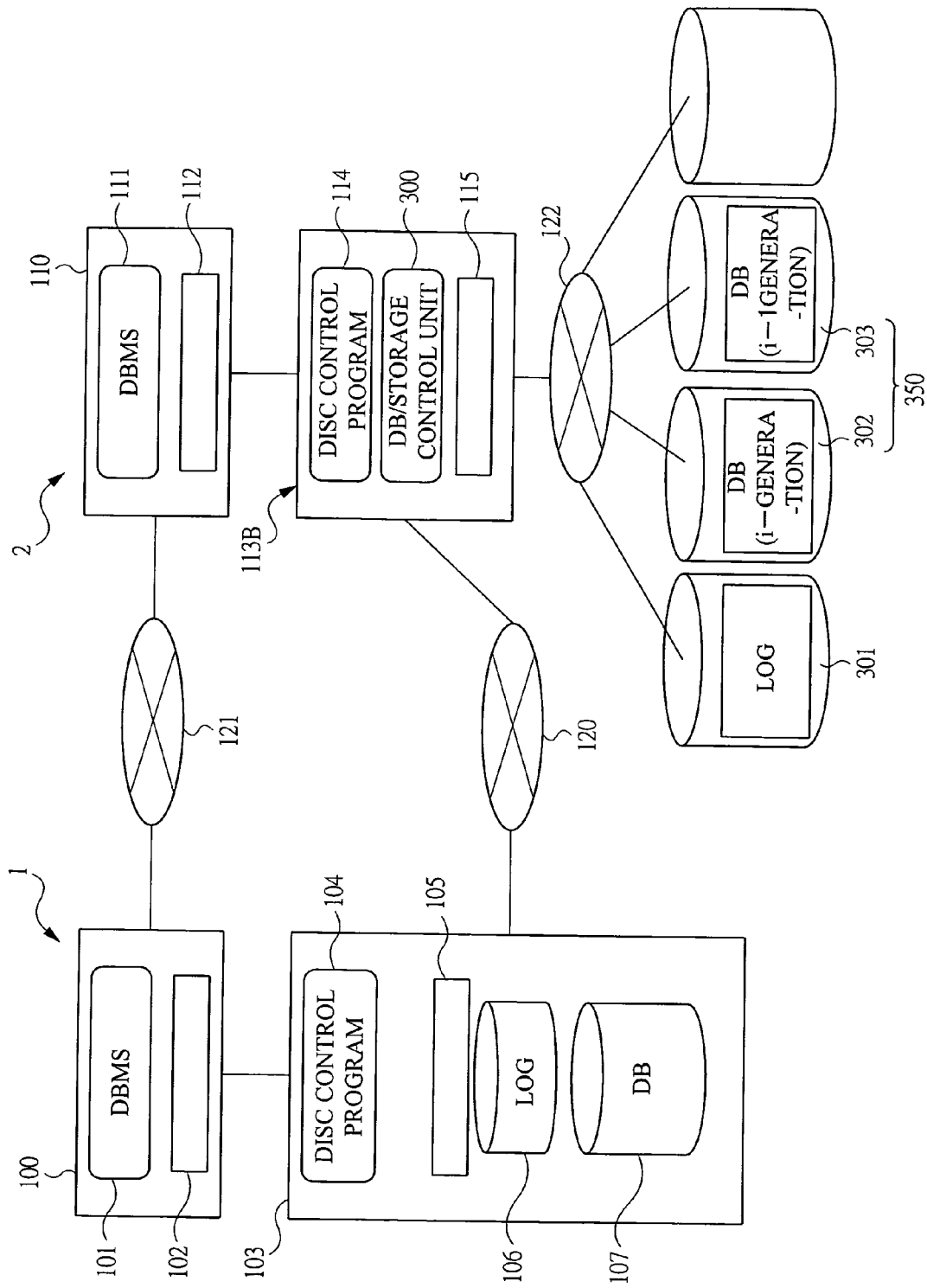
Figure 11A:
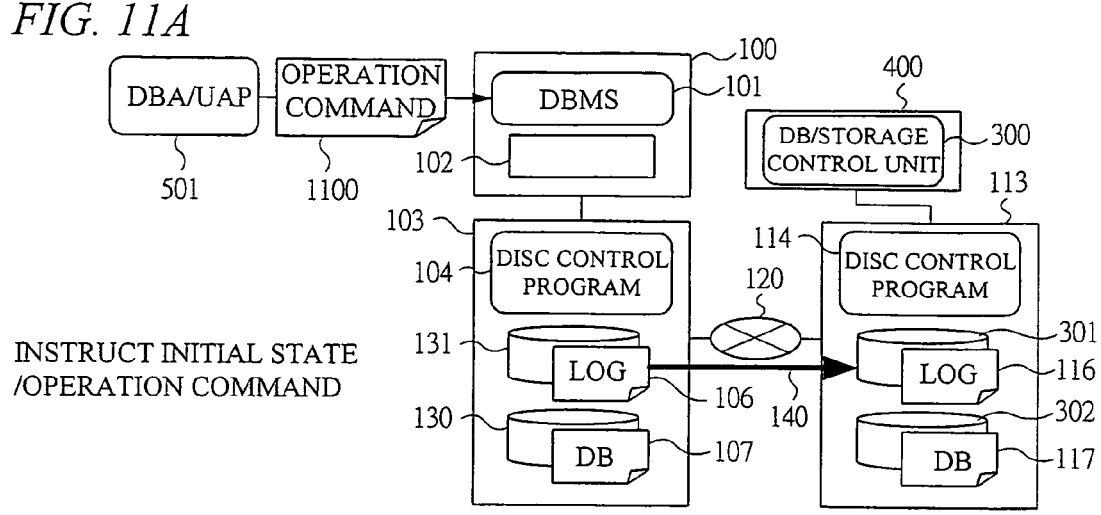
Figure 11B:
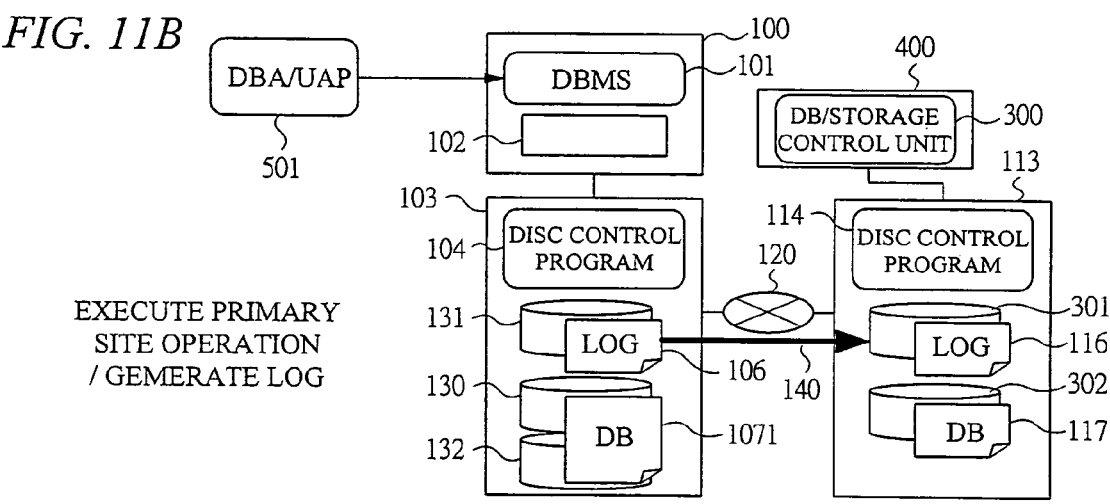
Figure 11C:
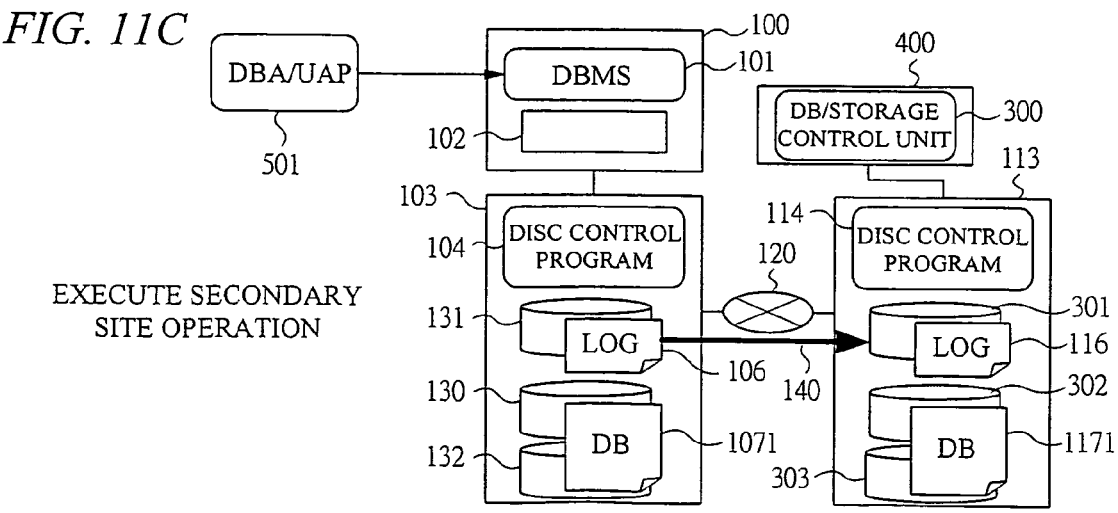

FIG. 10 shows a third modified embodiment, and is a block diagram of a system in the case that the disaster recovery is executed by two sites; and FIG. 11 shows the third modified embodiment, and is a block diagram of a system in the case that an operation command is executed by two sites, in which FIG. 11A shows an original state, FIG. 11B shows a state in which the operation command is executed in the primary site, and FIG. 11C shows a state in which the operation command is executed in the secondary site.

DESCRIPTION OF THE PREFERRED EMBODIMENTS

A description will be given below of an embodiment in accordance with the present invention with reference to the accompanying drawings.

Figure 1:
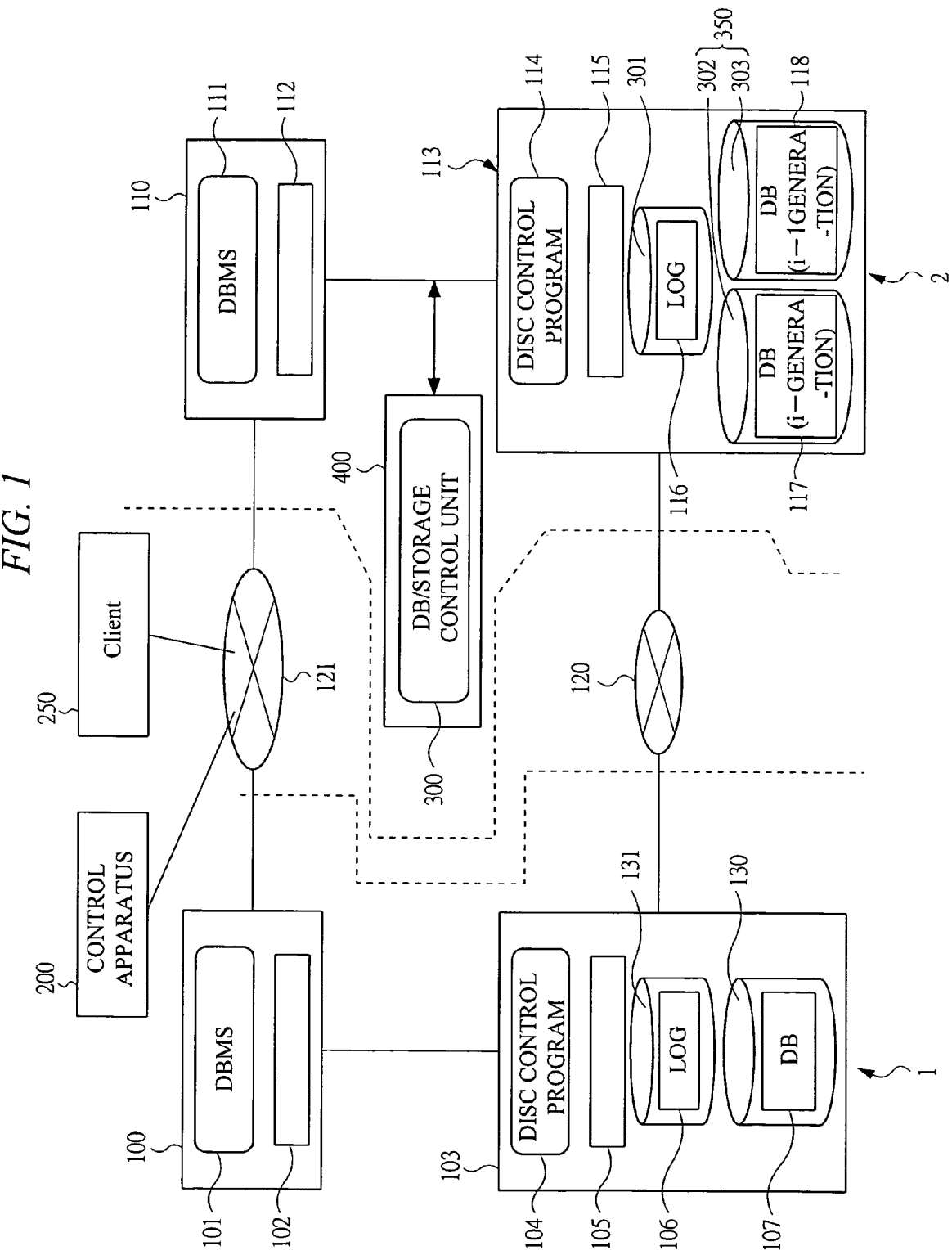
FIG. 1 shows an embodiment in accordance with the present invention, and is a block diagram of a system in the case a disaster recovery is executed by two sites.

FIG. 1 shows a typical system view used in the present invention, and shows an embodiment in which a disaster recovery is executed by two sites (systems).

In FIG. 1, a primary site (a first system) 1 is mainly constituted by a primary server 100 wherein a primary database management system (DBMS) 101 is operated and by a primary storage apparatus 103 storing a primary database 107 controlled by the primary DBMS 101.

A secondary site (a second system) 2 is mainly constituted by a secondary sever 110 wherein a secondary DBMS 111 is operated, a secondary storage apparatus 113 storing secondary databases 117 and 118 controlled by the secondary DBMS 111, and an exclusive apparatus (an intermediate apparatus) 400 executing a DB/storage control unit 300 corresponding to a sub set obtained by offloading (dividing) a part (a log application=database recovery function) of a DBMS function of the secondary DBMS 111. In this case, the exclusive apparatus 400 is arranged between the secondary sever 110 and the secondary storage apparatus 113, and is provided with CPU and a memory which are not illustrated.

Further, in the primary site 1 and the secondary site 2, the server and the storage apparatus are independently connected via a network 121 between servers connecting the primary server 100 and the secondary sever 110, and a network 120 between storage connecting the primary storage apparatus 103 and the secondary storage apparatus 113. Further, the primary storage apparatus 103 transfers an update data (a log of the primary DB 107) to the secondary storage apparatus 113, and in the secondary site 2, the secondary storage apparatus 113 stores a backup of the primary database (DB) 107 in the primary site 1.

To the server network 121, there are connected a control apparatus 200 controlling the primary and secondary sites 1 and 2, and a client computer 250 accessing to the primary DBMS 101 or the secondary DBMS 101.

The control apparatus 200 is constituted, for example, by a calculating machine such as a server in which a monitoring program (Monitor in the drawing) 501 is executed, detects a heartbeat of the primary server 100, detects a disability of the primary site 1 on the basis of a disability information of the primary storage apparatus 103 and the like, instructs a fail over to a DB/storage control unit 300 and the secondary sever 110 of the secondary site 2 at a time of detecting the disability, and have the secondary site 2 taking over the operation.

The client computer 250 is constituted, for example, by a calculating machine in which a business program (UAP=user application in the drawing) 500 is executed. The business program 500 of the client computer 250 accesses to the primary DBMS 101 with respect to a process of referring and renewing the primary DB 107 at a normal time. Further, it can access to the secondary DBMS 111 with respect to the primary DB 107 searching and referring operation.

In the case that the disability is generated in the primary site 1, the business program 500 of the client computer 250 accesses to the secondary DBMS 111 with respect to all the processes such as the updating process of the primary DB 107 and the searching and referring operation.

The primary site 1 is constituted by the primary server 100 and the primary storage apparatus 103. The primary server 100 is provided with CPU and a memory which are not illustrated, and the primary DBMS 101 of the primary DB 107 is installed in the primary server 100. The primary DBMS 101 accepts the operation from the client computer 250 and the control apparatus 200.

The primary DBMS 101 controls the primary database (DB) 107 by using a DB buffer 102 on the memory of the primary server 100 and the primary storage apparatus 103.

The primary DB 107 is stored in the disc storage unit 130 of the primary storage apparatus 103, however, normally executes a updating process on the DB buffer 102 because accessing to the primary storage apparatus 103 every time when the update is executed lowers a processing speed of the primary DBMS 101.

The primary DBMS 101 reflects the update of the primary DB 107 on the primary storage apparatus 103 at a preset timing in the case that the transaction (Tr) of the primary DB 107 is committed, or the case that the DB buffer 102 overflows or the like.

The primary storage apparatus 103 is constituted by a cash 105, a disc control program 104, a control apparatus (not shown), a plurality of disc storage units 130 and 131, and a plurality of volumes set in the disc storage units. A data main body of the primary DB 107 is stored in each of the volumes, and a log 106 having information of update difference to the data (the primary DB 107) is stored therein. In this case, the control apparatus of the primary storage apparatus 103 is provided with CPU and a memory which are not illustrated.

The disc control program 104 executed by the control apparatus of the primary disc storage unit 103 controls a remote copy with respect to the secondary storage apparatus 113 of the secondary site 2 via the storage network 120. In this case, only the log 106 is transferred in accordance with a synchronous remote copy or an asynchronous remote copy.

In other words, the primary DBMS 101 generates the log 106 indicating the update difference of the written data so as to write in the primary storage apparatus 103 before writing (renewing) the contents of the DB buffer 102 in the primary DB 107 of the primary storage apparatus 103. The disc control program 104 transfers the newly added log 106 to the secondary storage apparatus 113 via the storage network 120 at the predetermined timing as mentioned above.

The secondary site 2 is constituted by the secondary sever 110, the secondary storage apparatus 113 and an exclusive apparatus 400 executing a DB/storage control unit 300 including a partial function (for example, a log applying function) of the secondary DBMS 111.

In this case, the exclusive apparatus 400 may be constituted by a calculating machine provided with a processing capacity capable of executing the DB/storage control unit 300, does not require a processing capacity capable of executing the secondary DBMS 111, and can be constituted by a calculating machine having a lower processing capacity than the secondary sever 110.

The secondary DBMS 111 of the secondary sever 110 provides the searching and referring operation to the client computer 250 by using the secondary DB 118 backed up (being snapshot) to the secondary storage apparatus 113 at the normal time as mentioned below. Further, in the case that the disability is generated in the primary site 1, the secondary DBMS 111 takes over the primary DBMS 101 and executes the business.

The secondary storage apparatus 113 is provided with a disc control program 114 having a remote copy function, a cash 115, and a local mirror set 350 structured by a plurality of disc storage units.

The secondary storage apparatus 113 is provided with a plurality of disc storage units 301, 302 and 303, and a log 116 stored by the remote copy and controlled by the primary DBMS 101 is stored in a volume formed in the disc storage unit 303.

The disc storage units 302 and 303 structure the local mirror set 350, and a backup 117 (i generation in the drawing) of the most recent primary DB 107, and a backup 118 (i-1 generation in the drawing) of the proximate primary DB 107 are respectively stored in a plurality of volumes set in the disc storage units 302 and 303. In this case, it is assumed that the disc storage units 302 and 303 have respective one volumes 310 and 320. In this case, in the present embodiment, the volume 310 is a primary volume, and the volume 320 is a secondary volume.

The local mirror set 350 can execute a writing and reading control as the single volume 310 or 320, respectively, in a state in which the disc control program 114 splits (divides) a pair relation of a mirroring on the basis of the instruction from the DB/storage control unit 300, and stops the synchronization between the volumes. Further, in the case that a pair state is set by finishing the split, the mirroring is executed from the primary volume 310 to the secondary volume 320.

The backup of the primary DB 107 in the primary site 1 normally sets the volumes 310 and 320 to the split state and stores the most recent backup 117 only in the volume 310.

Further, on the basis of a predetermined timing (a requirement from a controller or a monitoring program 501 of the control apparatus 200, or the like), the DB/storage control unit 300 returns the local mirror set 350 to the pair state, and copies the contents of the volume 310 to the volume 320, thereby synchronizing two volumes 310 and 320. In accordance with the synchronization, the backup 118 of the volume 320 is updated to the most recent contents (generation). At this time, the DB/storage control unit 300 reads the backed up log 116, and determines all transaction of the backed up secondary DB 117. The contents (the secondary DB 118) of the copied volume 320 forms the snap shot of the primary DB 107 having the consistency in the transaction by executing the mirroring thereafter, whereby it is possible to assure the contents of the searching and referring operation executed by the secondary DBMS 111. In this case, in the present embodiment, there is shown a case that the monitoring program 501 of the control apparatus 200 requires the preparation of the snap shot to the primary site 1 at a predetermined cycle.

Thereafter, the DB/storage control unit 300 again sets the volumes 310 and 320 to the split state of the mirroring, and stores the most recent backup 117 only to the volume 310. Accordingly, the contents of the volume 320 is not updated by the remote copy until the next mirroring time, and it is possible to maintain the secondary DB 118 corresponding to the most recent snap shot having the consistency in the transaction level.

In the remote copy from the primary storage apparatus 103, only the log 116 including the information of the update difference of the primary DB 107 and the command from the primary DBMS 101 is transferred from the primary storage apparatus 103 to the secondary storage apparatus 113 in accordance with a remote copy function.

As discussed above, the remote copy may be constituted by the synchronous remote copy or the asynchronous remote copy. In the case of the synchronous remote copy, since the writing of the data of the primary DB 107 in the primary storage apparatus 103 is finished only after the writing in the secondary storage apparatus 113 is finished, it is possible to assure the copy of the data with no deficit even if the disaster or the disability is generated.

However, since a circuit delay of the server network 121 is added every writing time, an influence to the operation executed in the primary DBMS 101 is not negligible. On the other hand, in the case of using the asynchronous remote copy, since the process is continued on the assumption that the writing of the data in the primary storage apparatus 103 has been finished before the transferring to the secondary storage apparatus 113 is executed, the influence to the primary DBMS 101 is restricted to the minimum. However, in the case that the disaster is generated before the writing in the secondary storage apparatus 113 is finished, the deficit is generated.

After the starting time of the recovery, the secondary DB 117 is recovered by the log application in spite of the remote copy. The log application is executed by the exclusive apparatus 400 arranged between the secondary storage apparatus 113 and the secondary sever 110.

A log applying function corresponding to one function of the secondary DBMS 111 is offloaded to the exclusive apparatus 400 so as to form the DB/storage control unit 300 serving as the sub set of the secondary DBMS 111. Since it is sufficient that the exclusive apparatus 400 executes only the log application, the exclusive apparatus 400 has a low processing capacity and can be achieved by an inexpensive calculating machine. Accordingly, since it is sufficient that only the exclusive apparatus 400 is provided at the normal time, and it is not necessary to place the secondary sever 110 in the case that the searching and referring operation is not executed, it is possible to construct the DR system at a more inexpensive cost.

Further, since the DB/STORAGE control apparatus 300 serving as the subset has the limited function, it is not necessary to execute a complex management in comparison with the case of the secondary DBMS 111 having a full function, and it is possible to achieve a low cost performance in view of the operation management.

Further, in FIG. 1, the exclusive apparatus 400 is provided only in the secondary site 2 but the exclusive apparatus may be provided also in the primary site 1. For example, there is a case that a system (site) switching process is executed in accordance with a plan in addition to the time of the disaster. In this case, it is necessary to counterchange roles of the primary site 1 and the secondary site 2, whereby the business is executed by the secondary site, and the recovering process is executed by the primary site. In this case, it is necessary to counterchange a source from which the remote copy of the logs 106 and 107 is copied, and a destination to which the remote copy of the logs 106 and 107 is copied, and it is necessary to recover the primary DB 107 by the exclusive apparatus in the primary site.

[Software Structure of Primary DBMS 101]

Figure 2:
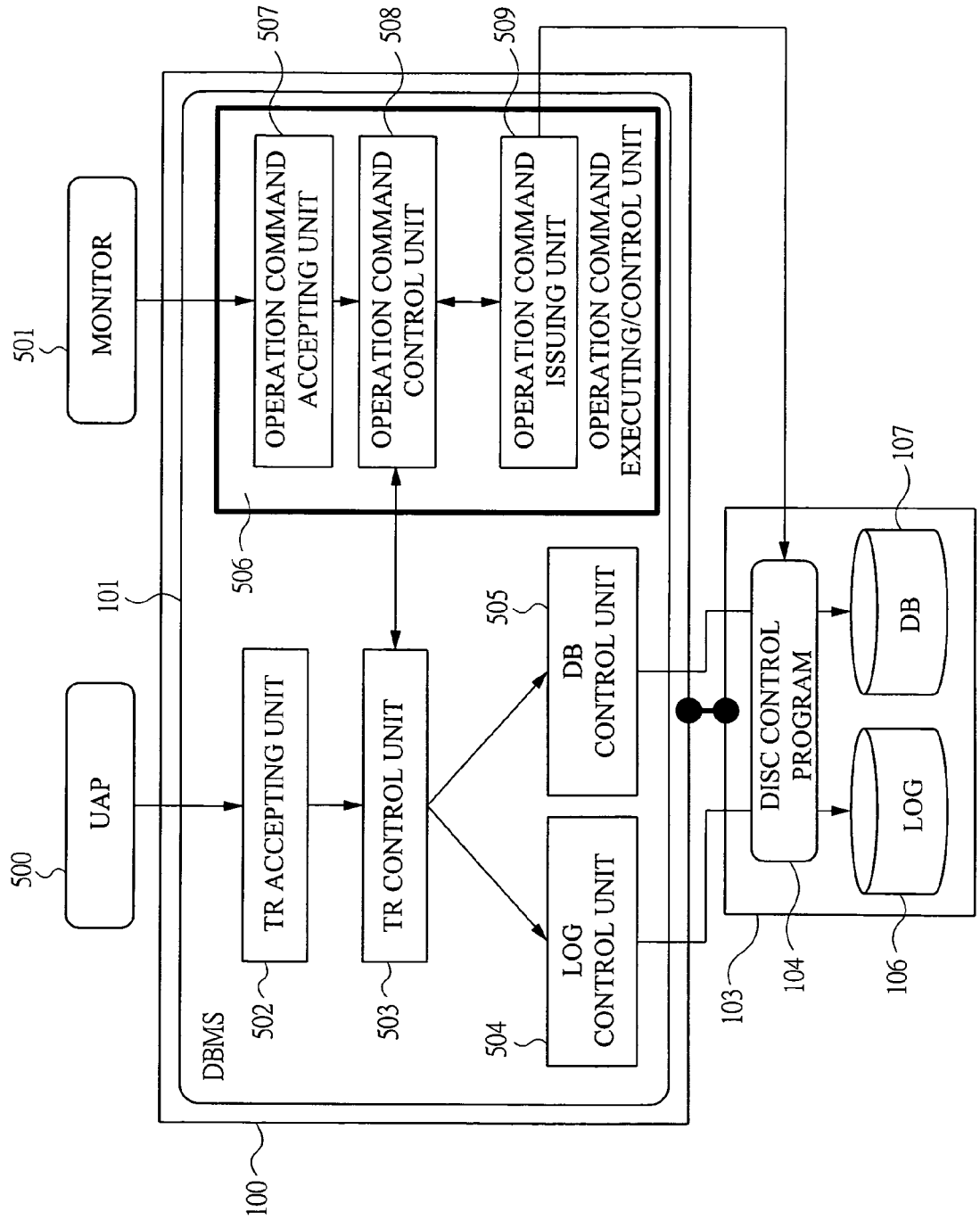
FIG. 2 is a block diagram showing a software structure of a primary DBMS of a primary site.

A software structure of the primary DBMS 101 in the primary site 1 is shown in FIG. 2.

The primary DBMS 101 is constituted by a transaction accepting unit 502 accepting a requirement from the business program 500 of the client computer 250, a transaction control unit 503 confirming a consistency of the transaction to be processed and executing the transaction, a DB control unit 505 executing the updating and the referring to the DB buffer 102 or the primary storage apparatus 103, a control unit 504 generating a update difference executed by the DB control unit 505 as a log, and generating an operation command for controlling the DB 107 and the secondary DB 117 and 118 of the secondary site 2 as a log, and an operation command execution control unit 506 accepting the requirement from the monitoring program 501 of the control apparatus 200 or the like as a command, and controlling the primary storage apparatus 103 or the secondary storage apparatus 113 of the sub site 2.

The operation command execution control unit 506 is constituted by an operation command accepting unit 507 accepting the requirement such as the snap shot forming or the like from the control apparatus 200 or the like, an operation command control unit 508 controlling an execution of the accepted operation command, and an operation command issuing unit 509 sending the control instruction in the primary storage apparatus 103 to the disc control program 104 on the basis of the operation command. In this case, the operation command may be constituted by the command of the DBMS, the OS and the application, and in this case, the command is issued to the DBMS, the OS and the application.

In order to control an executing timing of the accepted operation command, the operation command control unit 508 inquires the transaction control unit 503 about a determining state of the transaction, and sends an instruction required for executing the operation command to the operation command issuing unit 509. Further, in the case that it is necessary to execute the accepted operation command in the secondary site 2 in addition to the primary site 1, the operation command control unit 508 sends an instruction to the transaction control unit 503 so that the operation command is included in the log 106, and the transaction control unit 503 sends the operation command to the log control unit 504, and writes the operation command in the log 106.

For example, the accepted operation command is constituted by the snap shot forming, the operation command control unit 508 inquires the transaction control unit 503 about whether or not all the transactions have been determined.

If there is any transaction which is not determined, the operation command control unit 508 executes a staticization for forcibly determining all the transactions.

When the staticization is finished, the operation command control unit 508 sends an instruction to the transaction control unit 503 so as to write the snap shot preparing command in the log 106 after the staticizing command.

The transaction control unit 503 sends an instruction to the log control unit 504, prepares the log 106 in the order of the staticizing command and the snap shot preparation, and makes the disc control program 104 a request for writing.

The disc control program 104 executes the remote copy at a predetermined timing (a predetermined cycle or a update time of the log 106), the information of the update difference of the primary DB 107 and the log 106 including the operation command are transferred to the secondary storage apparatus 113 of the secondary site 2, and the secondary site 2 executes the backup of the primary DB 107 and the operation command from the primary DBMS 101, by analyzing the backed up log 116.

[Software Structure of DB/Storage Control Unit in Secondary Site 2]

Figure 3:
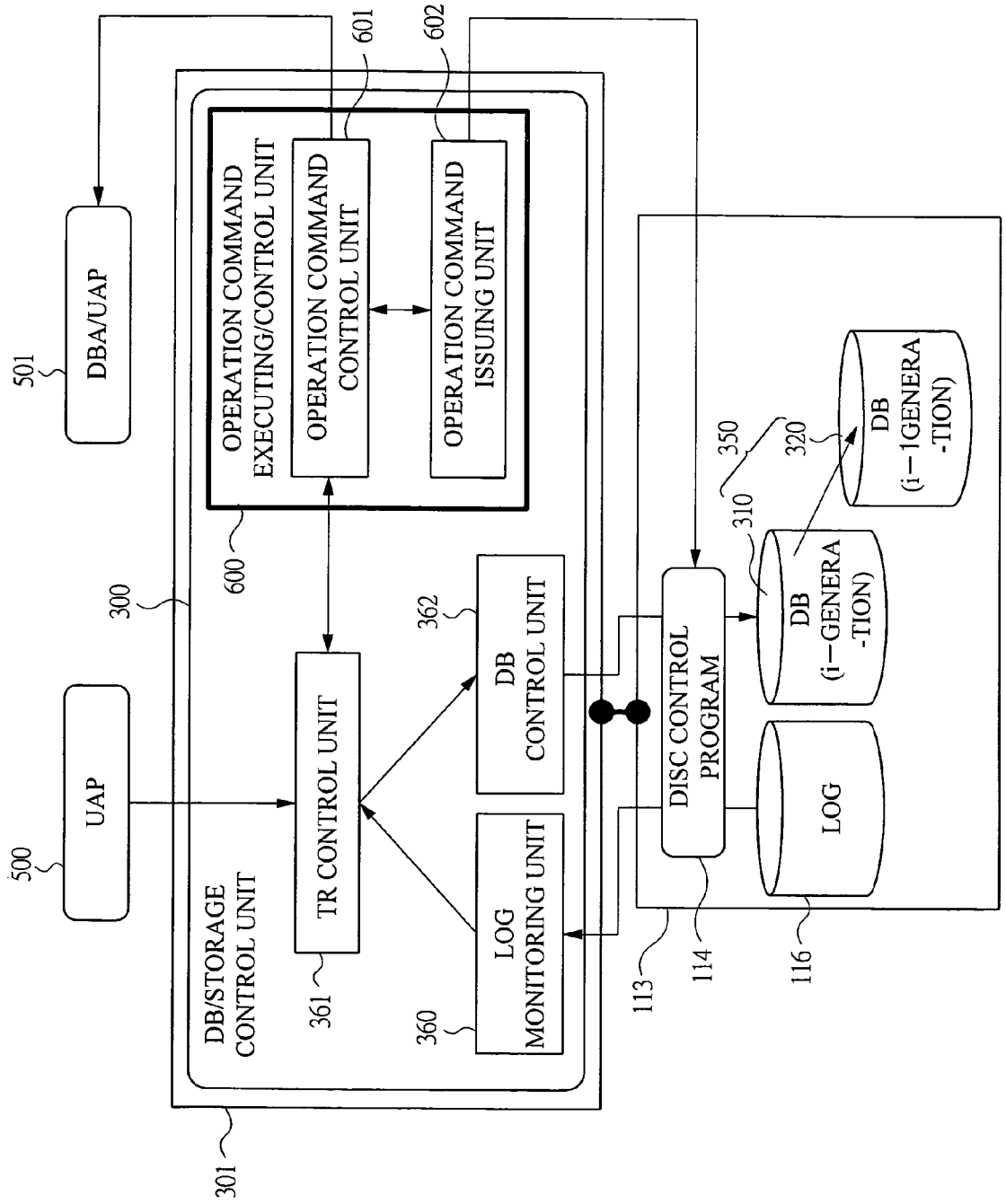
FIG. 3 is a block diagram showing a software structure of a DB/storage control unit of a secondary site.

FIG. 3 shows a structure of a software mainly constituted by the DB/storage control unit 300 of the secondary site 2.

The DB/storage control unit 300 is provided with a log monitoring unit 360 reading and monitoring the log 116 backed up from the primary site 1, a transaction control unit 361 instructing a DB control unit 362 such that if the log 116 read from the log monitoring unit 360 is a log indicating the update difference of the primary DB 107, the log is applied to the secondary DB 117 of the volume 310, and if the read log 116 is the operation command, the log is sent to an operation command execution control unit 600, and the DB control unit 362 applying the log 116 to the secondary DB 117 of the volume 310 so as to update the secondary DB 117. In this case, the transaction control unit 361 can accept requirements from a business program 500 of the client computer 250 and a monitoring program 501 of the control apparatus 200 and DBA (DB Administrator).

The operation command execution control unit 600 is constituted by an operation command control unit 601 controlling an execution of the operation command analyzed by the transaction control unit 361, and an operation command issuing unit 602 sending the control instruction to the secondary storage apparatus 113 to the disc control program 114 on the basis of the operation command.

In order to control an execution timing of the accepted operation command, the operation command control unit 601 inquires the transaction control unit 361 about the determining state of the transaction, and sends an instruction necessary for executing the operation command to the operation command issuing unit 602. Further, the operation command control unit 601 inquires the transaction control unit 361 about an execution result obtained by executing the operation command, and sends any abnormality to the monitoring program 501 of the control apparatus 200, thereby informing of the abnormality.

For example, in the case that the operation command for generating the snap shot is included in the log 116 following to the staticizing command, the operation command control unit 601 confirms with the operation command issuing unit 602 whether or not the staticizing is executed (the consistency of the transaction is secured).

The operation command control unit 601 inquires the transaction control unit 361 about whether or not all the transaction is determined (the staticizing is finished). If the staticizing is finished, the operation command control unit 601 instructs the snap shot generating command to the operation command issuing unit 602.

The operation command issuing unit 602 instructs the disc control program 114 to finish the split of the mirror set 350 and execute the mirroring in a pair state. Accordingly, the secondary DB 117 in a state in which the transaction is completely determined is backed up as the secondary DB 118 to the volume 320, and the snap shot at a time when the primary DBMS 101 writes the staticizing command on the log 106 is generated in the secondary DB 117 and the DB 118.

When the generation of the snap shot is finished, the operation command control unit 601 instructs the disc control program 114 via the operation command issuing unit 602 to finish the pair state of the local mirror set 350 and become split, and restarts the update of the secondary DB 117 of the volume 310 while storing the snap shot at a certain time point (PiT) in the volume 320.

[Process of Primary Site 1]

Figure 4:
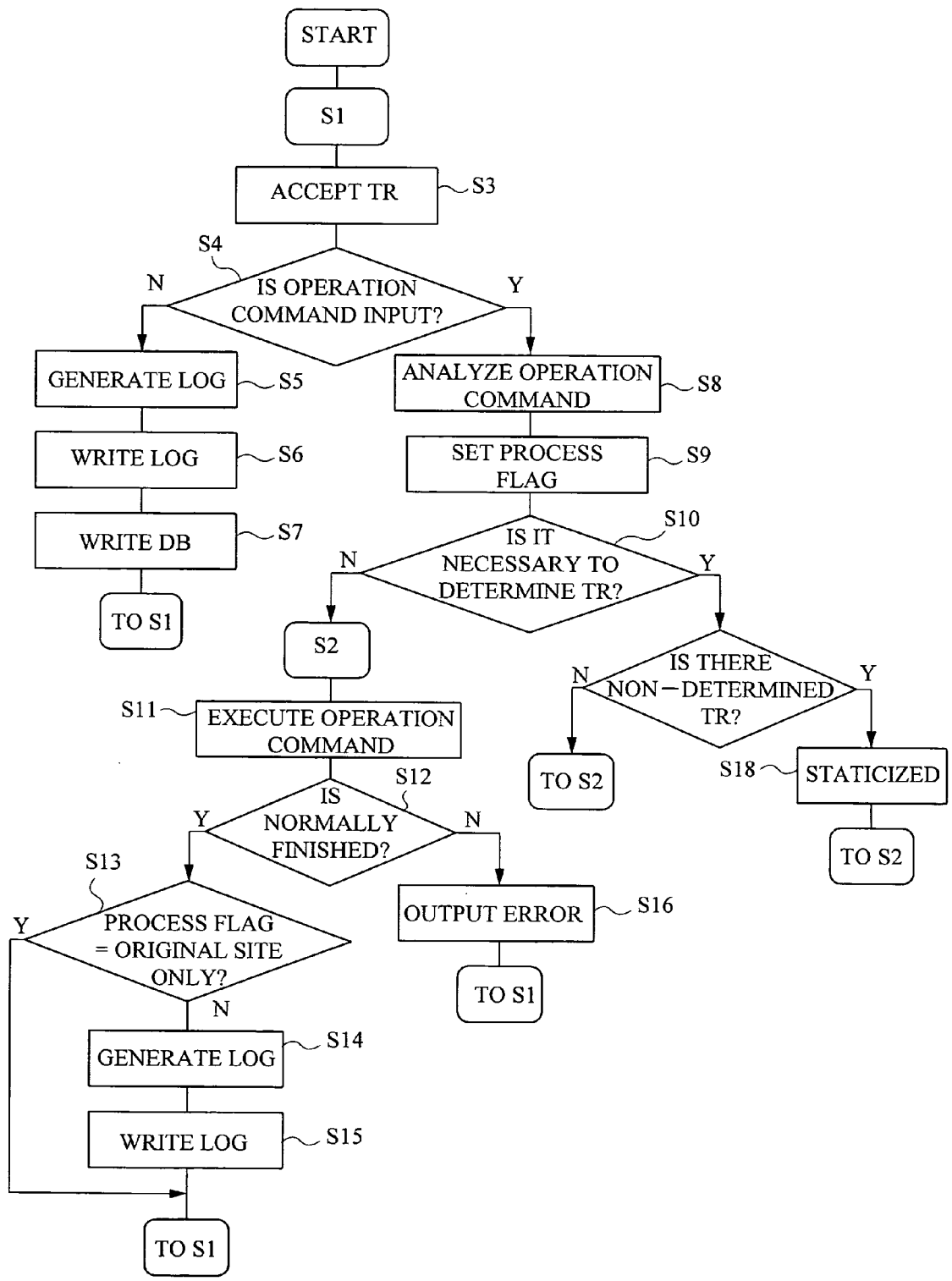
FIG. 4 is a flow chart showing an example of a process executed in the primary DBMS of the primary site.

FIG. 4 is a flow chart showing an example of a process executed in the primary DBMS 101 of the primary site 1. In the primary site 1, mainly the primary DBMS 101 controls the primary DB 107. In this case, it is assumed that the remote copy of the primary storage apparatus 103 is executed by the disc control program 104 at a predetermined timing.

First, in S3, the primary DBMS 101 accepts the requirement (the update requirement to the primary DB 107) from the business program 500 or the like of the client computer 250.

Next, it is determined whether or not the operation command is input to the primary DBMS 101 from the monitoring program 501 of the control apparatus 200 or DBA.

In the case that the operation command is not input, the step goes to S5, and the log corresponding to the update contents of the primary DB 107 is generated, and is written in the log 106 of the disc storage unit 131 in S6. Thereafter, S7 executes writing in the DB buffer 102 or the primary DB 107 of the primary storage apparatus 103, and the step goes back again to S1.

In the normal updating process from S5 to S7 mentioned above, after the log 106 is generated, the actual writing is executed and the primary DB 107 is updated. Further, the generated log 106 is remote copied to the secondary storage apparatus 113 by the disc control program 104 at the predetermined timing in the manner mentioned above.

On the other hand, in the case that the operation command is input in the determination in S4 mentioned above, the step goes to S8 and the contents of the operation command is analyzed.

The operation command is divided into a part commonly applied to the DB of the secondary site 2, a part applied only to the primary site 1, and a part applied only to the secondary site 2.

As the operation command commonly applied to the primary site 1 and the secondary site 2, there are a parameter change of the DBMS, a file extension command of the primary DB 107 and the secondary DB 108, and the like.

As the operation command applied only to the primary site 1, there are a performance measuring command of the primary DBMS 101, and the like, and as the operation command applied only to the secondary site 2, there are a performance measuring command of the secondary DBMS 111, a snap shot generating command and the like.

Next, S9 sets a process flag on the basis of a kind of the operation command analyzed in S8 mentioned above. The process flag may be set, for example, such that 032 common to primary and secondary, 1=only to primary site, 2=only to secondary site, and the like. Further, the operation flag is added to the operation command.

Next, the primary DBMS 101 determines whether or not it is necessary to determine the transaction for executing the operation command. For example, the critical command for the contents of the primary DB 107, such as the snap shot generating command, the file size change or the like, determines that it is necessary to determine the transaction, and the command having no relation to the contents of the primary DB 107 such as the performance measuring or the like determines that it is not necessary to determine the transaction.

In the case that it is not necessary to determine the transaction, the step goes to S11 from S2, and the operation command is executed. After executing the operation command, S12 determines whether or not the process to which the operation command is applied is normally finished.

In the case that the operation command is normally finished, the step goes to S13, and it is determined whether or not the process flag of the operation command is only the primary site 1 (the process flag=1). In the case of the operation command applied only to the primary site 1, the operation command is not written in the log 106 and is broken, and the step goes back to S1 as it is. Alternatively, the operation command may be written in the log after adding the information that the operation command can be executed in the secondary site 2.

On the other hand, in the case that the process flag of the operation command is commonly applied or applied only to the secondary site 2, it is necessary to transmit to the secondary site 2 via the log 106. Accordingly, the step goes to S14 so as to generate the corresponding log to the operation command, and after the log 106 is written in the disc storage unit 131 in S15, the step goes back to S1. The operation command written in the log 106 is transferred to the secondary storage apparatus 113 of the secondary site 2 by the remote copy, is interpreted by the DB/storage control unit 300 of the secondary site 2, and is executed.

In the case that the operation command is not normally finished in accordance with the determination in S12, the step goes to S16, and an error is output. The error can be informed from the operation command execution control unit 506 to the control apparatus 200. Further, the structure may be made such that the error is written in the log 106 so as to be transmitted to the secondary site 2. After outputting the error, the step goes back to S1.

Next, in the case that the determination of the transaction is necessary for executing the operation command, in the determination in S10 mentioned above, the step goes to S18 and the staticization of the primary DB 107 is executed. After all the transactions are determined on the basis of the staticization, the step goes to S2, and the operation command is executed.

In the case that there is no transaction which is not determined yet in S17 mentioned above, the step goes to S2, and the operation command is executed.

In accordance with the process mentioned above, in the case that the operation command is not input, after the log 106 is generated in response to the update requirement of the primary DB 107, the log 106 is written in the primary storage apparatus 103. In the case that the operation command is input, it is determined on the basis of the contents of the operation command whether or not it is necessary to determine the transaction. In the case that it is necessary, the operation command is executed after executing the staticization.

Further, after executing the operation command, the operation command except the operation command applied only to the primary site 1 is written in the log 106, and the operation command is transmitted to the secondary site 2 via the log 106.

[Process of Secondary Site]

Figure 5:
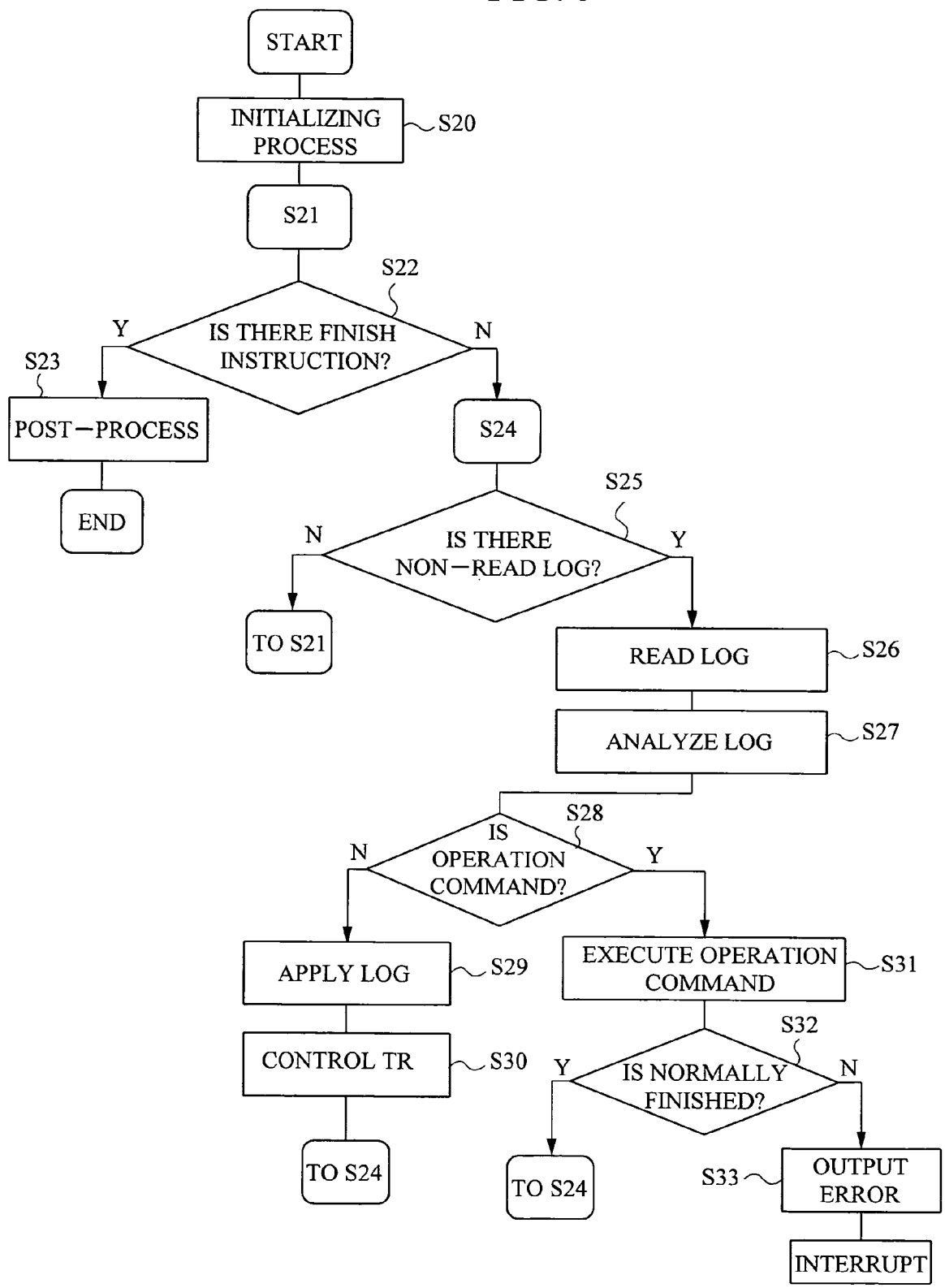
FIG. 5 is a flow chart showing an example of a process executed in the DB/storage control unit of the secondary site.

FIG. 5 is a flow chart showing an example of a process executed in the DB/storage control unit 300 of the secondary site 2. In the secondary site 2, the DB/storage control unit 300 mainly renews the secondary DB 117 and generates the snap shot. In this case, the secondary DBMS 111 accepts the searching and referring requirement from the business program 500 of the client computer 250, however, since this matter is well known, a detailed description will be omitted here.

The DB/storage control unit 300 of the secondary site 2 first executes an initializing process in S20. The initializing process sets a reading position where the log 116 backed up in the secondary site 2 is read, or the like. In this case, the reading position is determined in correspondence to the previous end position or the like.

Next, in S21 and S22, it is determined whether or not a backup finishing instruction is accepted from the monitoring program 501 of the control apparatus 200 or the business program 500 of the client computer 250 or DBA. In the case that the finishing instruction is executed, the step is finished after executing a predetermined after treatment (clear of variable and buffer) in S23.

If the finishing instruction is not generated, the step goes to S25 from S24, and it is determined whether or not the log 116 is read to the terminal end. In the case that the log 116 is read to the terminal end, the step goes back to S21 and a loop is repeated until the log 116 is added.

On the other hand, in the case that the log 116 is not read to the terminal end, the step goes to S26, and the log 116 is read. Further, in S27, the read log 116 is analyzed, and is divided into the log of the update difference in the primary DB 107, and the log of the operation command.

In S28, it is determined whether or not the analyzed log 116 is constituted by the operation command. In the case that it is not constituted by the operation command, that is, in the case that it is constituted by the log of the update difference, the step goes to S29, the log 116 is applied to the secondary DB 117 of the primary volume 310 so as to be updated, and the determining state of the updated transaction is controlled in S30. Further, the step goes back to S24, and reading the log 116 is repeated until reaching the terminal end of the log 116.

On the other hand, in the case that the read log 116 is constituted by the operation command, in the determination in S28, the step goes to S31, and the operation command is executed. If the operation command is normally finished, the step goes to S24 from S32, and the next log 116 is read. In the case that any abnormality is generated in executing the operation command, the step goes to S33, an error is output, and the process is interrupted. In this case, it is sufficient that the output of the error informs of the matter that the error is generated in the control apparatus 200 and the client computer 250. Further, after the interruption, the controller recovers the process.

[Generation of Snap Shot]

As discussed above, if the snap shot generation requirement is output from the monitoring program 510 of the control apparatus 200 by the primary DBMS 101 of the primary site 1 and the DB/storage control unit 300 of the secondary site 2, the primary DB 107 of the primary site 1 is first staticized, and all the transactions are determined.

After finishing the staticization, the staticizing command and the snap shot generating command are written in the log 106. The log 106 is remote copied to the secondary storage apparatus 113 of the secondary site 2 in accordance with the disc control program 104.

In the secondary site 2, the DB/storage control unit 300 reads the backed-up log 116 and executes the log application to the secondary DB 117 so as to synchronize with the primary DB 107.

The staticizing command and the snap shot generating command written in the log 116 are sequentially interpreted by the DB/storage control unit 300, and in the case of the staticizing command, the staticization of the secondary DB 117 is checked. Thereafter, the local mirror set 350 is set to a pair state on the basis of the snap shot generating command, and the secondary DB 117 of the primary volume 310 is written in the secondary volume 320 so as to set as the secondary DB 118.

At this time, since the secondary DB 118 forms the contents of the primary DB 107 at the time when the primary DBMS 101 issues the staticizing command and all the transactions are in the determined state, it is possible to assure the contents of the searching and referring operations provided by the secondary DBMS 111 using the secondary DB 118. Further, when the disability is generated in the primary site 1 and the operation is taken over to the secondary site 2 in accordance with the fail over, it is possible to rapidly restart the business by the secondary DBMS 111 without executing any special recovering process, by using the secondary DB 118 in which all the transactions have been determined. In other words, it is not necessary to recover the consistency of the transaction as in the backup in the block level, for example, in the prior art mentioned above, and it is possible to switch immediately from the primary site 1 to the secondary site 2.

Further, after the generation of the snap shot is finished, it is possible to again set the local mirror set 350 to the split state, and it is possible to continue the backup on the basis of the log application in the secondary DB 117 of the primary volume 310.

In this case, in the secondary DBMS 111, there is shown an example that the searching and referring function is provided, however, since the local mirror set 350 of the secondary storage apparatus 113 is set to the split state except a time of generating the snap shot, and the primary volume 310 and the secondary volume 320 to which the log 116 is applied are independent, the renewing operation can be provided by using the secondary DB 118 of the secondary volume 320. In this case, although the consistency with the primary DB 107 of the primary site 1 is not secured, it is possible to execute a test of version up of the DBMS in the secondary site 2, for example. Accordingly, it is possible to execute a software development using the actual data, and it is possible to improve the added value of the DR system requiring a lot of cost.

Alternatively, in the case that the disability is generated in the primary site 1, and the instruction of the fail-over is output to the DB/storage control unit 300 from the monitoring program 501 of the control apparatus 200, the log 116 is applied to the secondary DB 117 of the primary volume 310, and the secondary DB 117 is recovered. Thereafter, the primary volume 310 may be mounted on the secondary DBMS 111, and may be switched from the primary site 1 to the secondary site 2.

In this case, in the embodiment mentioned above, there is shown the example employing the mirror function of the mirror set 350, however, a differential snap shot may be employed. The differential snap shot reflects the actual update after storing the data before being updated in the different disc region, in the case that the update is added to the volume to be subjected. Accordingly, since the snap shot area may store only the update portion in spite of all the primary volume 310, it is possible to reduce the volumetric capacity of the secondary storage apparatus 113 secured for the snap shot. Further, since a plurality of snap shots are generated and are stored in the different regions, it is possible to control plural generation of snap shots.

Further, in the embodiment mentioned above, the staticizing command and the snap shot generating command are separately written in the log 106, however, the structure may be made such that the DB/STORAGE control apparatus 300 can execute the staticization check and the mirroring by writing any one command in the log 106.

Further, in accordance with the present invention, since the structure is made such that the remote copy of the log 106 is executed by the primary site 1 and the secondary site 2, the operation command is written in the log 106 in addition to the update difference of the primary DB 107, and the log application and the operation command are executed by interpreting the log 116 backed up by the secondary site 2, it is possible to output the instruction of generating the snap shot to the secondary site 2, without using the server network 121, and it is possible to eliminate the load and the waiting time required for the communication so as to reduce the load of the primary site 1 and the secondary site 2.

Further, in accordance with the present invention, since it is sufficient to add the function of writing the operation command in the log, and the function of analyzing the log so as to execute the log application of the update difference and the operation command, it is possible to easily achieve without requiring a large modification of the DBMS.

Second Embodiment

Figure 6:
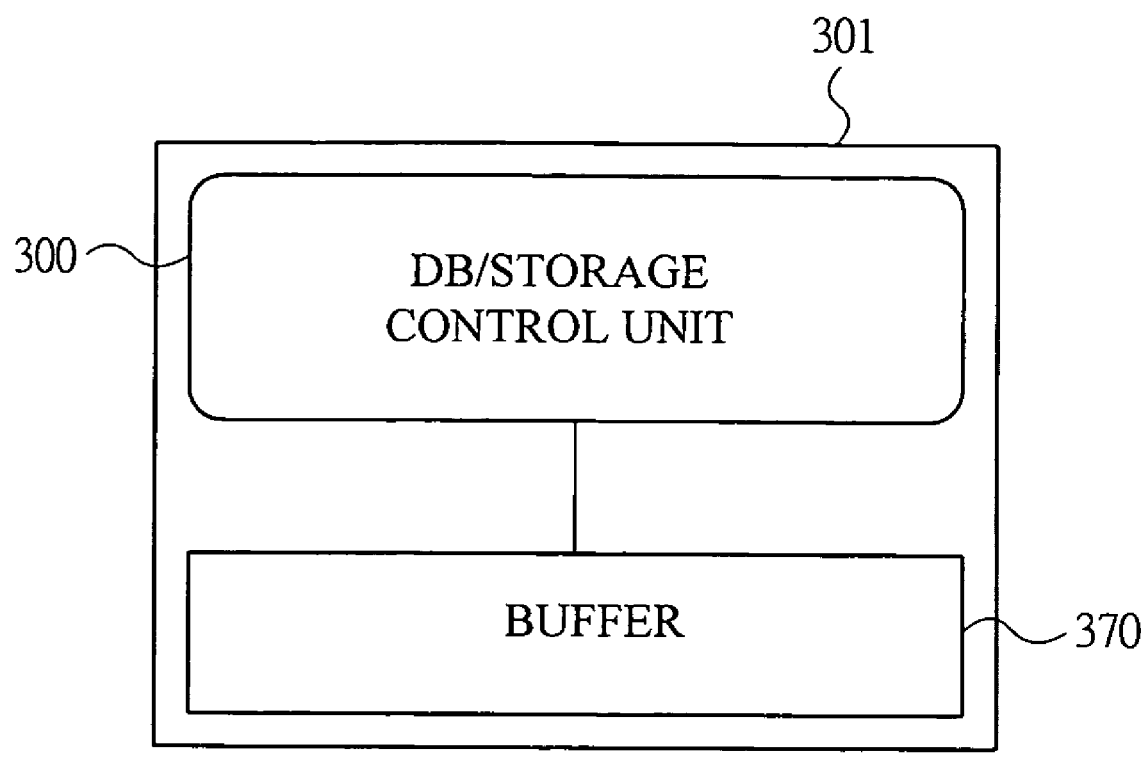
FIG. 6 shows a second embodiment, and is a block diagram showing a structure of an exclusive apparatus of the secondary site.

FIG. 6 shows a second embodiment, in which a buffer 370 reading the log 116 is provided in the DB/storage control unit 300 of the secondary site 2 in accordance with the first embodiment, and the other structures are the same as those of the first embodiment mentioned above.

In the second embodiment, the DB/storage control unit 300 redoes (reproduces) the determined transaction by applying the log while analyzing the transaction.

In the present second embodiment, the primary site 1 writes the snap shot generating command in the log 106 at an optional time point regardless of the staticization.

Figure 7:
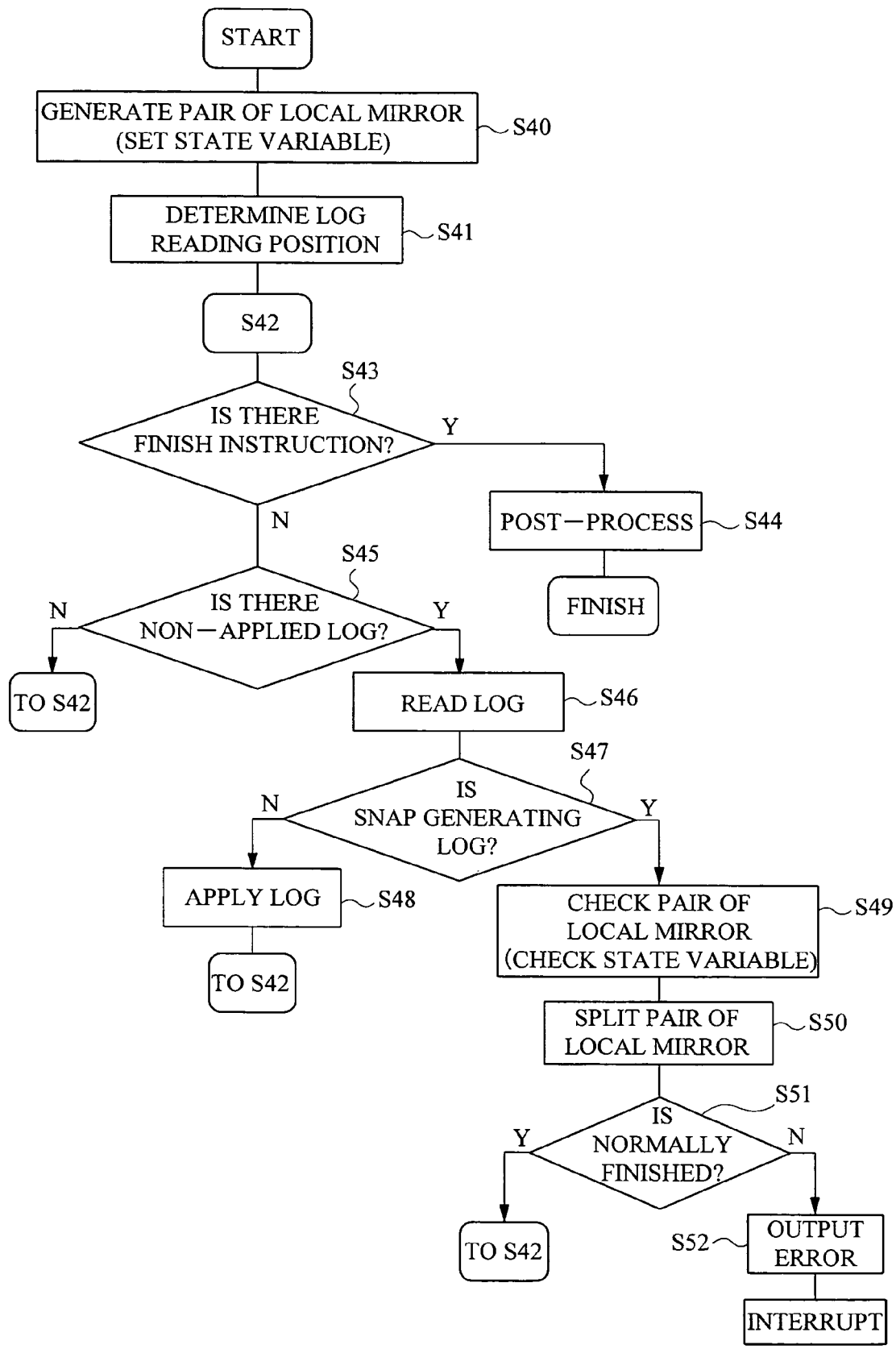
FIG. 7 shows the second embodiment, and is a flow chart showing an example of a process executed in the DB/storage control unit of the secondary site.

Next, a description will be given of an example of a process executed by the DB/storage control unit 300 of the secondary site 2 with reference to FIG. 7.

First, in S40, the local mirror set 350 of the secondary storage apparatus 113 in the secondary site 2 is set to a pair state, the primary volume 310 and the secondary volume 320 are synchronized, and the secondary DB 118 is set to a snap shot at the starting. Further, when the synchronization is finished, a predetermined value indicating that the synchronization is finished is set to a state variable indicating the synchronization state. Further, a process after S41 is executed while keeping the local mirror set 350 in the pair state.

In S41, a reading position of the log 116 of the secondary storage apparatus 113 in the secondary site 2 is determined on the basis of the previous state or the like in the same manner as the first embodiment mentioned above, and the step goes to a process after S42.

In S43, it is determined whether or not the instruction of finishing the backup is accepted from the monitoring program 501 of the control apparatus 200 or the business program 500 of the client computer 250 or DBA. In the case that the finish instruction is output, the step is finished after a predetermined after treatment (the clearing step of the variable or the buffer) is executed in S44.

If the finish instruction is not output, the step goes to S45, it is determined whether or not the log 116 is read to the terminal end. In the case that the log is read to the terminal end, the step goes back to S42 and the loop is repeated until the log 116 is added.

On the other hand, in the case that the log 116 is read to the terminal end, the step goes to S46 and the log 116 is read in the buffer 370. Further, in S47, the read log 116 is analyzed, and is divided into the log in the update difference of the primary DB and the log of the operation command, and it is determined whether or not the analyzed log 116 is constituted by the operation command. In the case that the log is not constituted by the operation command, that is, the log is constituted by the log of the update difference, the step goes to S48, the log 116 is applied to the secondary DB 117 of the primary volume 310. In the case that the transaction is determined, the secondary DB 117 is updated by redoing (reproducing).

As a result, since the local mirror set 350 is in the pair state, the secondary DB 118 of the secondary volume 320 is simultaneously updated, and the most recent snap shot is generated.

After applying the log 116, the step goes back to S42, and the reading or the log 116 is repeated until the log 116 reaches the terminal end.

On the other hand, in the case that the read log 116 is constituted by the snap shot preparing command in accordance with the determination in S47, the step goes to S49, and after it is confirmed that the state variable is constituted by a predetermined value indicating the synchronous state, the local mirror set 350 is set to the split state in S50, and the secondary DB 117 of the primary volume 320 and the secondary DB 118 of the secondary volume 320 are separated in the synchronous state.

If the snap shot generating command is normally finished, the step goes to S51, and it is determined whether or not the command is normally finished. In the case that no abnormality is generated by executing the snap shot generating command, the step goes to S52, and the process is interrupted by outputting an error. In this case, it is sufficient that the output of the error informs of the matter that the error is generated in the control apparatus 200 and the client computer 250. Further, after the interruption, the controller recovers the process.

In accordance with the processes mentioned above, the DB/storage control unit 300 of the secondary site 2 always recovers the backup of the primary DB 107 by applying the log 116 read into the buffer 370 to the secondary DB 117 and redoing the determined transaction. Further, at the time of applying the log 116, the local mirror set 350 is set to the pair state, and the primary volume 310 and the secondary volume 320 are set to be synchronized.

Further, in the case that the snap shot generating command is included in the log 116, the secondary DB 118 of the secondary volume 320 finishes the log application and is disconnected by changing the local mirror set 350 to the split state.

The secondary DB 118 of the secondary volume 320 becomes the consistent snap shot to which the transaction determining the snap shot generating command in the side of the primary site 1 to the issuing time point is reflected.

As discussed above, in the case that the staticization is not executed, the determined transaction is always redone, and the local mirror set 350 is set to the split state at a time when the snap shot preparing command comes to the secondary site 2, whereby it is possible to generate the snap shot having the consistency of the transaction in the secondary volume 320.

Further, since it is sufficient to only write the snap shot generating command in the log 106 without executing the staticization, in the primary site 1, it is possible to make the load required for processing the snap shot generation extremely small. In this case, the snap shot generating command may be input to the primary site 1 from the monitoring program 501 of the control apparatus 200 in the same manner as the first embodiment mentioned above, and the primary DBMS 101 may issue the snap shot generating command (write in the log 106) at a predetermined cycle.

Modified Embodiment 1

Figure 8:
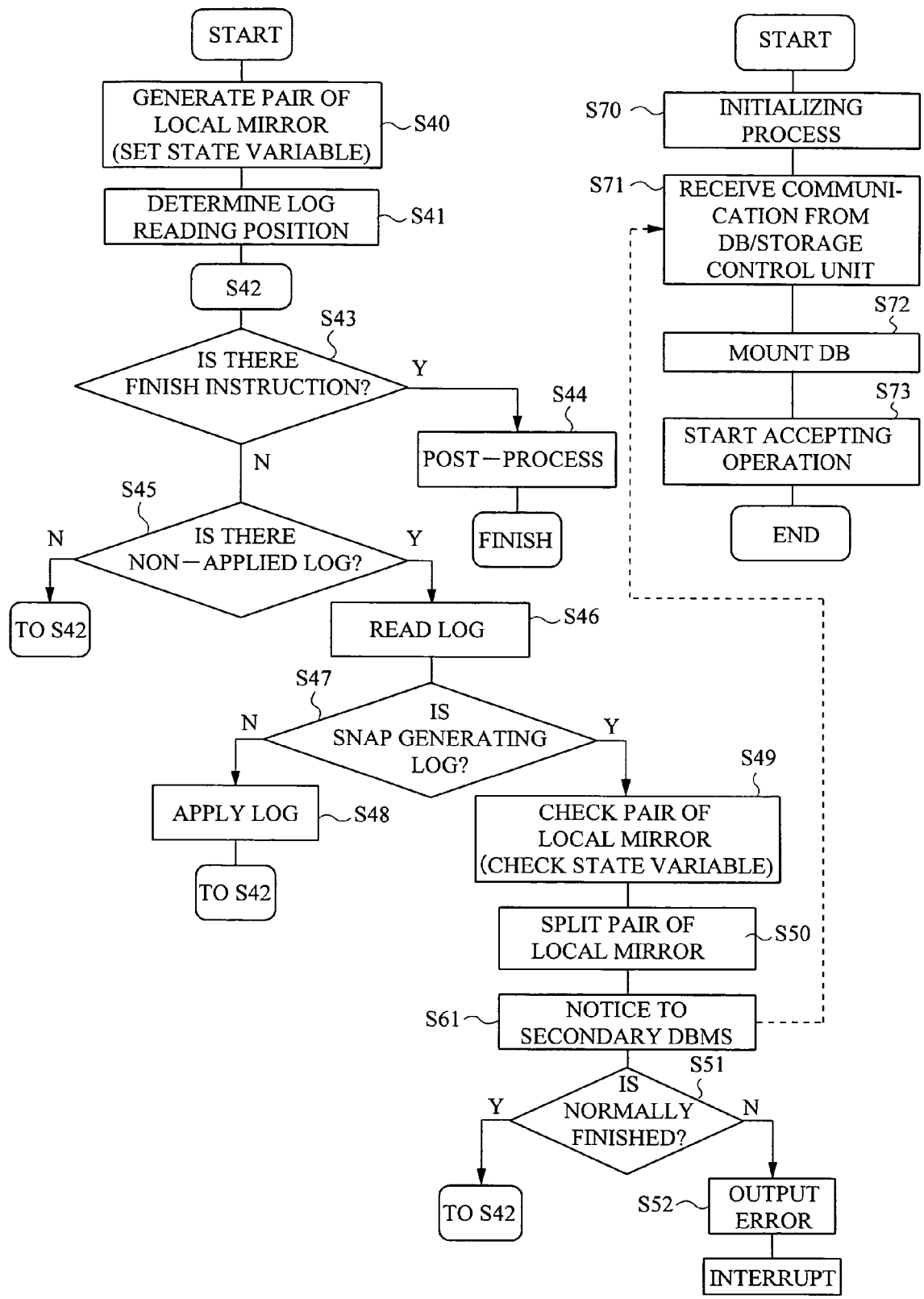
FIG. 8 shows a first modified embodiment, and is a flow chart showing an example of a process executed in the DB/storage control unit and a secondary DBMS of the secondary site.

FIG. 8 shows an example in a case of working the process in the DB/storage control unit 300 in accordance with the second embodiment with the searching and referring operation starting process of the secondary DBMS 111 in the secondary site 2.

S40 to S52 in FIG. 8 are the same as those of the second embodiment mentioned above, and FIG. 8 is different in that a process (S61) of noticing that the snap shot is generated in the secondary DBMS 111 is added after the process in S50.

S70 to S73 in FIG. 8 show an example of the searching and referring operation starting process of the secondary DBMS 111.

S70 executes an initializing process for the secondary DBMS 111 starting the searching and referring operation, and S71 waits until the notice from the DB/storage control unit 300 reaches.

When the secondary DBMS 111 receives the notice that the generation of the snap shot is finished from the DB/storage control unit 300, the secondary DBMS 111 mounts the secondary DB 118 of the split secondary volume 320, in S72. Thereafter, the providing of a predetermined operation is started by using the mounted secondary DB 118, in S73.

The secondary DBMS 111 can execute the searching and referring operation on the basis of the DB having consistency in the transaction, by working the DB/storage control unit 300 with the secondary DBMS 111 and mounting the volume in which the secondary DBMS 111 generates the snap shot after finishing the generation of the snap shot.

In this case, the operation of the secondary DBMS 111 is not limited to the referring operation as mentioned above, may be constituted by executing the update. For example, the structure may be made such that a batch process having a high processing load such as a monthly process and an end-of-period process is executed by the secondary DBMS 111 by using the snap shot. Accordingly, it is possible to disperse the batch process actually executed in the primary DBMS 101 into the secondary DBMS 111, and it is possible to execute the batch process having the high processing load in the secondary site 2 while preventing the response of the primary site 1 from being lowered.

Modified Embodiment 2

Figure 9:
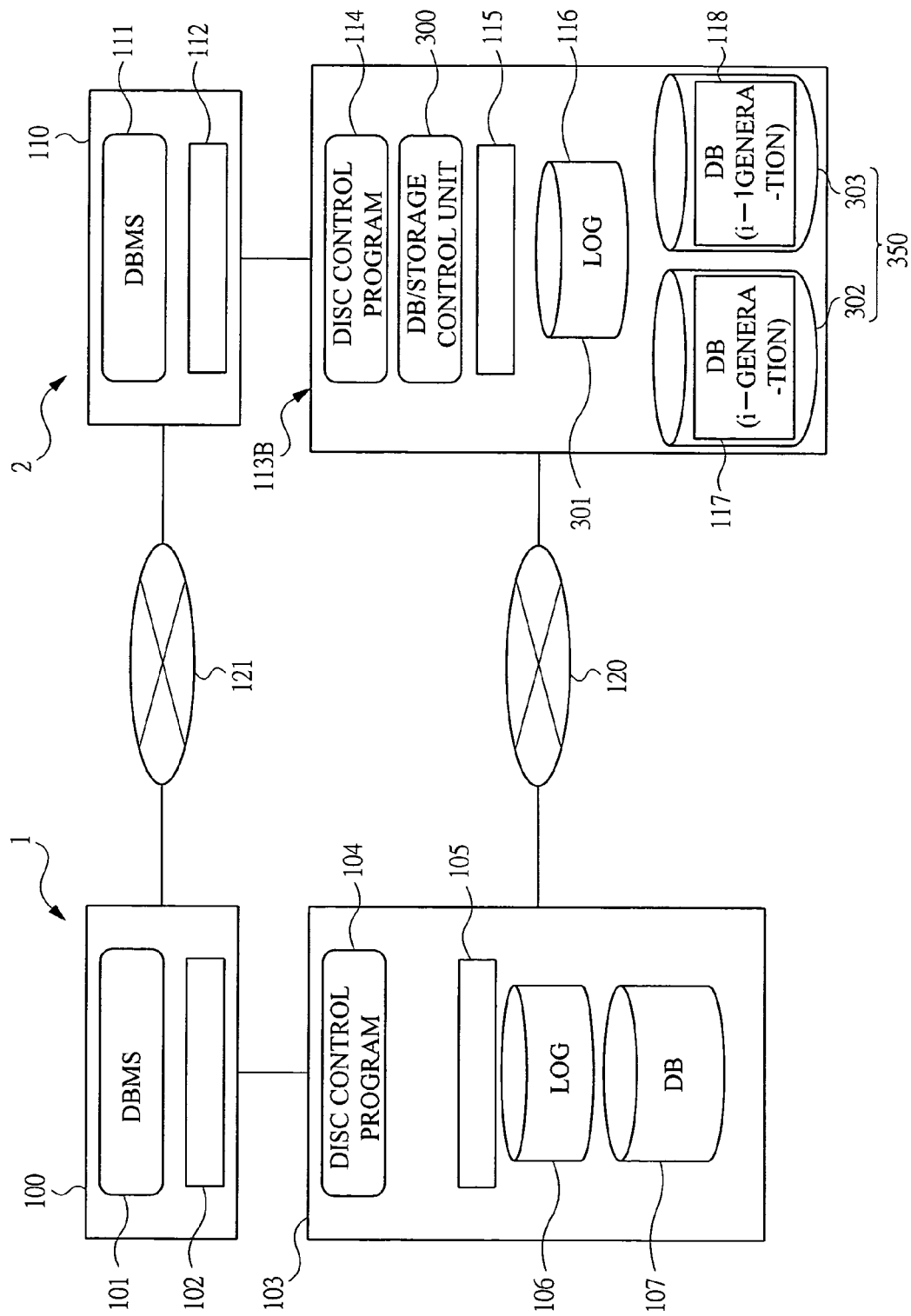
FIG. 9 shows a second modified embodiment, and is a block diagram of a system in the case that the disaster recovery is executed by two sites.

FIG. 9 shows a structure obtained by replacing the secondary storage apparatus of the secondary site 2 in accordance with the first embodiment mentioned above by NAS 113A, and the other structures are the same as those of the first embodiment mentioned above.

The NAS 113A is provided with the disc control program 114, the cash 115, the local mirror set constituted by the disc storage units 302 and 303, and the disc storage unit 301, in the same manner as the secondary storage apparatus 113 in accordance with the first embodiment mentioned above, and the DB/storage control unit 300 is executed in addition to the disc control program 114, in a control unit (not shown) of the NAS 113A.

In this example, the exclusive apparatus 301 for executing the DB/storage control unit 300 shown in the first embodiment mentioned above is not required, and it is possible to lower a cost required for constructing and maintaining the DR system.

Modified Embodiment 3

FIG. 10 shows a structure obtaining by replacing the NAS 113A in accordance with the modified embodiment 2 mentioned above by SAN server 113B, and the other structures are the same as those of the modified embodiment 2 mentioned above.

The SAN server 113B is provided with the disc control program 114, the cash 115, and the DB/storage control unit 300, is connected to the primary storage apparatus 103 of the primary site 1 via the storage network 120, and is connected to the disc storage units 301, 302 and 303 via a storage area network (SAN).

The disc storage units 302 and 303 may construct the mirror set 350 by the SAN server 113B, or may construct the mirror set 350 in one disc storage unit.

In this case, in the first and second embodiment, there is shown the case that the monitoring program 501 of the control apparatus 200 requires the generation of the snap shot to the primary site 1, however, the primary DBMS 101 may instructs the generation of the snap shot (the generation of the log 106) at a predetermined timing (in the case that the cycle or the state of the DB 107 satisfies a predetermined condition).

Modified Embodiment 4

The description is given by using the snap shot command as the operation command, however, the operation command may be constituted by a command of DBMS/storage/AP or the like.

A description will be given below by using an example in which the DB file is extended, with reference to FIG. 11.

In this case, it is assumed that the log file 106 and the DB file 107 exist respectively in the disc storage unit 131 and the disc storage unit 130 in which the log and DB are stored in the primary site 1.

It is assumed in the same manner that the secondary log file 116 and the secondary DB file 117 exist in the secondary site 2.

In the case that the insertion is repeatedly executed, it is necessary to extend a size of the DB file 107. In specific, the extension of the file is executed subsequently after executing the extension of the region of the disc storage unit first.

FIG. 11A shows an initial state before extending the disc storage unit and the file. A database administrator (DBA) and user application (UAP) input an operation command 1100 in the order of a disc storage unit extension and a file extension to the primary DBMS 101 from the client computer or the control apparatus shown in the first embodiment mentioned above.

FIG. 11B shows a state after the operation command is executed.

When receiving the operation command, the primary DBMS 101 executes the operation command, and packs the operation command in the log so as to write the operation command in the log file 106.

At this time, in order to execute the operation command under the uniform DB state in the primary and secondary sites, the staticization as mentioned above may be executed in the primary site before executing the operation command.

In execution of the operation command, the different disc storage unit 132 is first secured in the secondary storage 103, and the DB file 1071 is extended subsequently so as to be astride the disc storage units 130 and 132. In this case, the file obtained by extending the DB file 107 corresponds to the DB file 1071.

FIG. 11C shows a state in which the operation command is executed in the secondary site 2.

In the secondary site 2, the DB/storage control unit 300 monitors the log file 116 and executes the log application so as to update the DB file 117.

The log file 116 is updated by the remote copy 140, however, as a result of the update, when the operation command packed in the log in FIG. 11B is read, the log is analyzed and the operation command is executed.

In this case, two commands constituted by the disc storage unit extension and the file extension are packed.

The different disc storage unit 303 is first secured in the secondary storage 113, and the DB file 1171 is subsequently extended so as to be astride the disc storage units 302 and 303. In this case, the file obtained by extending the DB file 107 corresponds to the DB file 1071.

In the case that the timing for executing the operation command is displaced between the primary and secondary sites, for example, in the case that the extension of the DB file 1171 in the secondary site 2 is different from the original timing (the extension timing in the primary site 1), the insertion to be executed after the extension may be possibly executed in the DB file 117 before being extended, in the secondary site 2. In this case, an error is generated.

However, in the case of working with the staticization as in the present invention, it is possible to secure to execute the operation command at the same timing and order in the DB file in the uniform state. Accordingly, the error mentioned above is not generated.

What is claimed is:

1. The disaster recovery system executing a backup operation while arranging a first system and a second system in remote locations, wherein the first system comprises:

a first calculating machine executing a first DBMS providing the first database;

a first storage for storing a log to which an update difference of the first database is output at each of transactions, and the first database;

a command adding unit for adding a command to the log; and a remote copy unit transferring the log to the second system, wherein the second system comprises:

a second storage for storing a log received from the first system and a second database; and a database recovering unit for recovering the second database on the basis of the log received from the first system, and wherein the database recovering unit comprises:

a command extracting section for extracting the command included in the log; and a command executing section for executing the extracted command, wherein the command adding unit adds to the log a snapshot generating command for instructing a snapshot generation as an instruction output to the second system, wherein the second storage has a mirror set capable of changing a plurality of volumes between a pair state and a split state, wherein the command executing section instructs the second storage to generate the snapshot in the case that the extracted command is constituted by a snapshot generating command, and wherein the second storage stores the mirror set in the second database under a split state after writing the second database in a plurality of volumes so as to synchronize by setting the mirror set to a pair state, on the basis of the snapshot generating instruction.

2. The disaster recovery system according to claim 1, wherein the command adding unit is included in the first DBMS, and adds the snapshot generating command to the log after performing staticization of the first database, at the time of adding the snapshot preparing command to the log, and wherein the command executing section applies the snapshot generating instruction to the second storage after staticizing the second database, in the case that the extracted command is constituted by the snapshot generating command.

3. The disaster recovery system according to claim 1, wherein the second system includes a second calculating machine executing a second DBMS to provide the second database stored in the second storage, and wherein the second DBMS mounts the volume of the mirror set in the split state, and provides the stored second database.

4. The disaster recovery system according to claim 1, wherein the second storage is constituted by NAS, and the NAS includes the database recovering unit.

5. The disaster recovery system according to claim 1, wherein the second storage is provided with SAN, and a server connected to the SAN so as to execute the database recovering unit and to write the log received from the first system in the second storage.

6. The disaster recovery system executing a backup operation while arranging a first system and a second system in remote locations, wherein the first system comprises:

a first calculating machine executing a first DBMS providing the first database;

a first storage for storing a log to which an update difference of the first database is output at each of transactions, and the first database;

a command adding unit for adding a command to the log; and a remote copy unit transferring the log to the second system, wherein the second system comprises:

a second storage for storing a log received from the first system and a second database; and a database recovering unit for recovering the second database on the basis of the log received from the first system, and wherein the database recovering unit comprises:

a command extracting section for extracting the command included in the log; and a command executing section for executing the extracted command, wherein the command adding unit adds to the log a snapshot generating command instructing a snapshot generation as an instruction output to the second system, wherein the second storage has a mirror set capable of changing a plurality of volumes between a pair state and a split state, wherein the database recovering unit has a transaction control unit which reads the log from the second storage to determine a non-determined transaction of the second database, wherein the command executing section instructs the second storage to generate the snapshot in the case that the extracted command is constituted by a snapshot generating command, and wherein the second storage switches the mirror set from a pair state to a split state on the basis of the snapshot generating instruction to store the second database obtained by determining the transaction.

7. The remote command execution method of duplicating the data from a first database executed by a first system to a second database duplicated in a second storage provided in a second system, comprising:

a process of recording a log of a update difference of the first database in a first storage;

a process of writing the update difference of the first database in the first storage;

a process of combining a command applied to the first or second system with the log;

a process of transferring the log including the update difference and the command to the second system;

a process of storing the transferred log in the second storage;

a process of reading the log of the second storage and recovering the second database on the basis of the log of the update difference;

a process of extracting the command from the log of the second storage; and a process of executing the extracted command, wherein the process of combining the command with the log includes a process of combining with the log a snapshot preparing command for instructing a preparation of a snapshot by the second system, and wherein the process of executing the extracted command includes:

a process of setting a plurality of volumes of a mirror set constituting the second storage to a pair state so as to write the second database in each of the volumes to synchronize to each other in the case that the extracted command is a snapshot preparing command; and a process of setting the mirror set to a split state so as to store the second database after the synchronization is finished.

8. The remote command execution method according to claim 7, wherein the process of adding the snapshot generating command to the log includes a process of staticizing the first database, and a process of adding the snapshot generating command to the log after finishing the staticization, and wherein the process of writing and synchronizing the second database includes a process of staticizing the second database, and a process of setting a plurality of volumes of the mirror set to a pair state after finishing the staticization and writing the second database in each of the volumes.

9. The remote command execution method according to claim 7,
- wherein the process of combining the command with the log includes a process of combining a snapshot preparing command for instructing a preparation of a snapshot by the second system with the log,
- wherein the process of recovering the second database includes a process of reading the log from the second storage and determining the non-determined transaction of the second database, and a process of setting a plurality of volumes of a mirror set constituting the second storage to a pair state so as to write the second database in each of the volumes to synchronize to each other, and
- wherein a process of executing the extracted command includes a process of switching a plurality of volumes of a mirror set constituting the second storage from a pair state to a split state in the case that the extracted command is constituted by a snapshot generating command, thereby storing the second database.

10. The remote command execution method according to claim 7, further comprising:
- a process of mounting the volume of the mirror set having stored the second database; and
- a process of providing the second database of the mounted volume.

11. The remote command execution method according to claim 7, further comprising:
- a process of accepting the command by the first system;
- a process of analyzing the command;
- a process of executing the instruction by the first system in the case that the command is constituted by an instruction applied only to the first system; and
- a process of breaking the executed command.

12. The remote command execution method according to claim 7, further comprising:
- a process of accepting the command by the first system;
- a process of analyzing the command;
- a process of executing the instruction by the first system in the case that the command is constituted by an instruction capable of being executed by the first system and the second system; and
- a process of writing the executed command into the log.

13. The remote command execution method according to claim 7, further comprising:
- a process of accepting the command by the first system;
- a process of analyzing the command;
- a process of executing the instruction by the first system in the case that the command is constituted by an instruction applied only to the first system; and
- a process of breaking the executed command.

14. The remote command execution method according to claim 7,
- wherein the process of adding the command applied to the first or second system to the log includes:
- a process of determining whether or not it is necessary to secure a consistency of the transaction for executing the command;
- a process of adding a command securing the consistency of the transaction prior to the command in the case that it is necessary to secure the consistency; and
- a process of securing the consistency of the transaction by the first system.

* * * * *